Patented Nov. 15, 1949

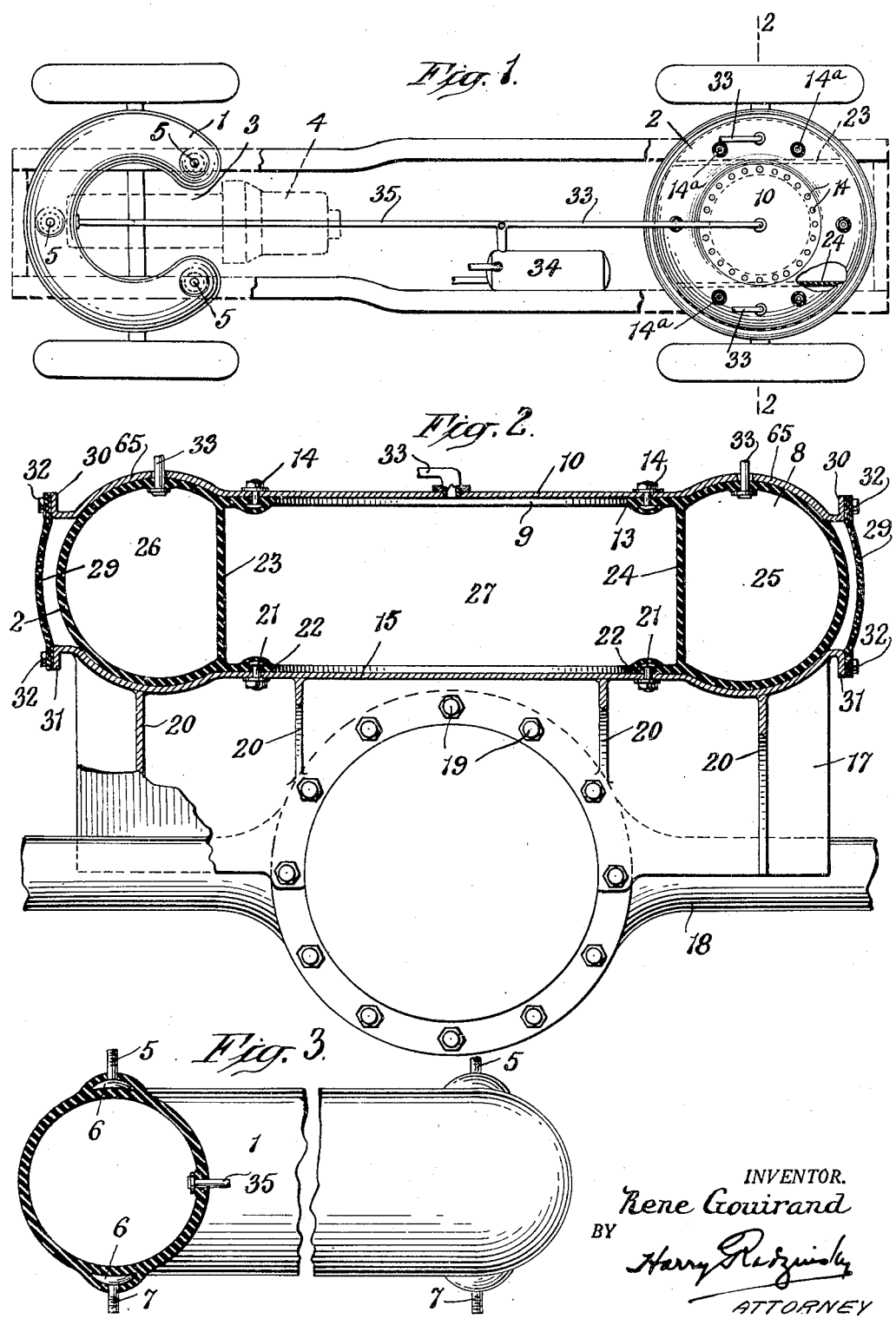

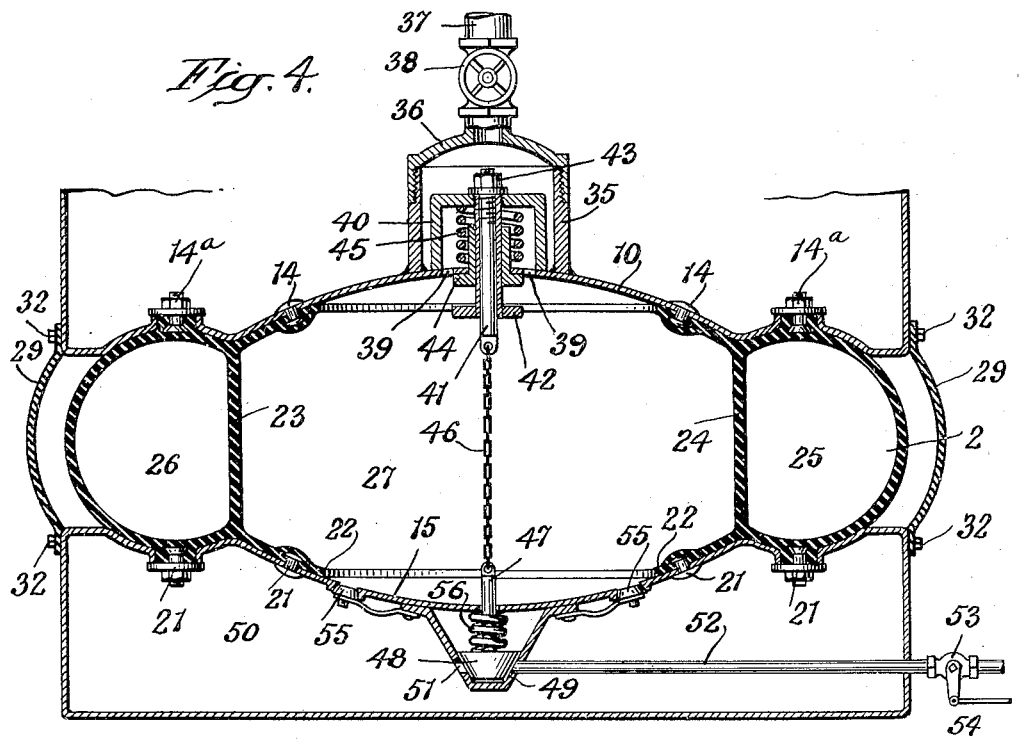
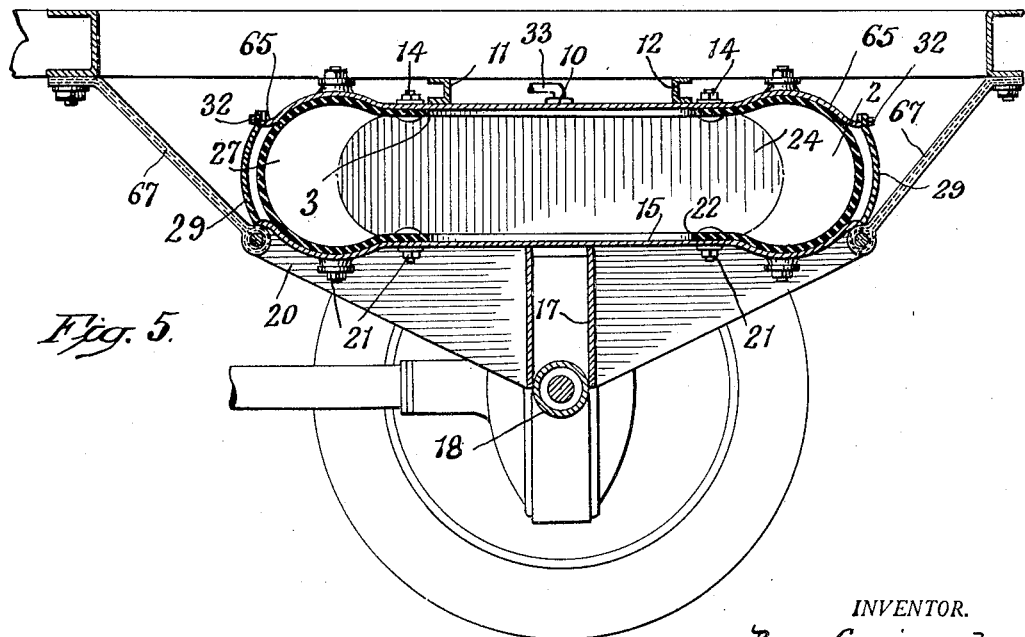

2,488,288

UNITED STATES PATENT OFFICE 2,488,288

PNEUMATIC SUSPENSION DEVICE

Rene Gouirand, New York, N. Y.

Application October 6, 1945, Serial No. 620,767

7 Claims. (Cl. 280—124)

1

This invention relates to the pneumatic suspension of vehicle bodies, wherein air-inflated cushions are interposed between the axles and the chassis frame or body of a vehicle and thereby serve to resiliently support the load and to absorb road shocks. Examples of pneumatic suspension devices in the same general class as that to which the present invention relates, will be found in my Patents No. 1,555,199, dated September 29, 1925 and No. 2,042,596, dated June 2, 1936.

In said patents, and in other prior patents, the pneumatic suspension means consists of four air cushions for each pair of wheels, two of the cushions being disposed above the axle of the vehicle and two below. In such constructions, each pair of cushions so employed was located adjacent to a wheel similar to the manner in which elliptic leaf springs are mounted in various types of vehicles.

The present invention contemplates the provision of a greatly simplified construction, wherein a single, large and relatively flat air cushion of considerable expanse may be located in the space between each axle and the chassis frame of the vehicle, the body of the vehicle and the load carried thereby being supported on the cushion and, because of the large area of the cushion and the distribution of the weight thereover, the load being pneumatically suspended in a manner that extraordinary ease of riding is assured.

An object of the invention is to provide, in a structure of this character, a cushion of such a size and relatively great expanse that it will occupy the major portion of the space between the wheels of each pair; that it will present sufficient area to enable it to resiliently support the body and its load and maintain it evenly and against shock even under extraordinary road conditions, and that the cushion may be maintained in position between the chassis and body by simplified means resulting in lightness of construction as well as in great strength and durability for the cushion-maintaining elements.

Another object of the invention is to provide in an apparatus of the character described, inflating means for maintaining a predetermined amount of air pressure in a pneumatic cushion according to the load imposed on the vehicle, said means contemplating the automatic inflation or deflation to a required degree while the vehicle is being loaded or unloaded, whereby the air pressure in the cushion will be regulated according to the weight of the body and its load, with the result that when the vehicle departs on its trip, it will invariably begin the trip with the required air pressure in the pneumatic suspension means according to the load imposed on the vehicle.

The invention contemplates numerous other features and advantages to be hereinafter pointed out and set forth in the claims appended hereto.

In the accompanying drawings, wherein several illustrative embodiments of the invention are disclosed, Fig. 1 is a plan view of the chassis of an automotive vehicle, the same being somewhat diagrammatically shown, showing the application thereto of the improved pneumatic suspension means. In this view the opposite end portions of the chassis frame are broken away and shown in phantom, in the interest of clearness. Fig. 2 is a sectional view taken substantially on the line 2—2 of Fig. 1; Fig. 3 is a sectional view through the front pneumatic cushion; Fig. 4 is a sectional view through a pneumatic cushion, showing the means by which a predetermined air pressure will be maintained in the cushion according to the load imposed on the vehicle, and Fig. 5 is a sectional view taken at right angles to that of Fig. 2.

The improved pneumatic suspension means, while herein shown as applied to automotive vehicles, is adapted for many uses, including railway coaches, freight cars, airplanes and many other vehicles. In Fig. 1 is shown the manner in which the suspension means may be applied to an automobile, truck, trailer or the like, the drawing diagrammatically showing the proposed location of the two pneumatic cushions as applied to an automobile. The front cushion I, arranged for location at the forward part of the chassis of the vehicle, is shown to be of substantially C-shape, the cushion thus having an open rear end 3 to enable it to clear portions of the motor, diagrammatically indicated at 4, or other operating parts of the vehicle.

In the form shown, the cushion I is disclosed as a heavy-walled, continuous tube made airtight to permit it to be inflated to the required extent. Provided in the wall of the cushion I is a plurality of upwardly extending studs 5, each of which has its head 6 embedded in the wall of the cushion, said studs being adapted to be secured in a suitable plate or other element on the body or chassis frame of the car or truck. Downwardly projecting studs 7, also having the embedded heads 8, attach the lower part of the cushion to a suitable lower plate or other supporting member carried by the front axle, the manner in which this cushion is disposed being more specifically described in respect to the rear cushion 2.

In the embodiment of the invention shown in Fig. 1, the rear cushion 2 consists of an annular member which may be constructed of a combination of rubber or synthetic rubber and fabric or cord in the manner in which these materials are employed in tire construction to thereby provide a tough, elastic and compressible casing. An annular tube may be employed in the casing or the casing itself may be made air-tight. The cushion is formed with a central aperture 9, closed at the top by means of an overlying or upper disk-shaped bearer plate 10 fastened to the chassis frame of the vehicle by means of the channel bars 11 and 12 seen in Fig. 5. The central portion of the upper bearer plate 10 is secured to the flange portion 13 of the cushion, said flange portion defining the central opening through the cushion, by means of the bolts or rivets 14 or other equivalent fastening elements, the arrangement being such that an air-tight joint is provided between the cushion 2 and the plate 10, and the plate 10 serves to close the top of the central opening through the cushion. Additional bolts 14a may be employed to fasten the top portion of the cushion 2 to the bearer plate 10, and it will be observed that adjacent to its marginal outer edge, the bearer plate 10 is curved as indicated at 66 to conform to the curvature of the portions of the cushion over which these parts of the plate 10 extend.

The lower end of the central opening 9 extending through the cushion 2 is closed by means of an underlying or lower bearer plate 15 having a surface similar to that of the upper bearer plate 10 and forming the top element of a cushion support 17 bolted or otherwise rigidly attached to or over the axle 18 of the vehicle, by the bolts 19 or other suitable fastening elements. The support 17 is reinforced and strengthened by means of the webs 20, the shape and arrangement of this support being largely dependent upon the nature of the particular vehicle to which the pneumatic suspension means is attached. Bolts 21, or other equivalent fastening means secure the plate member 15 to the lower flange 22 of the cushion member 2.

The disposition of the pneumatic cushion 2 between the upper and lower bearer plates 10 and 15 is such that the central portion of the cushion constitutes a large closed air chamber, the same being closed by the plates 10 and 15. The area of this chamber is such that it supports the greater portion of the weight of the vehicle and its load. It will be observed that the cushion 2 is provided interiorly with a pair of spaced, substantially vertical partitions 23 and 24, extending longitudinally of the vehicle, said partitions being preferably composed of rubber, or of combinations of rubber and fabric, and being thus of an elastic nature whereby the same may be flexed under compression and expansion of the cushion during use. The location and disposition of the vertical partitions 23 and 24 is such as to cause the cushion 2 to be transversely divided into three independent chambers, namely, the central relatively large chamber 27, and the two smaller side chambers 25 and 26. The central chamber 27 has preferably, but not necessarily, greater air capacity than either of the side chambers 25 and 26.

Protection is afforded for the exposed or side portions of the cushion 2 by means of a suitable flexible shield 29 extending either wholly or partly about the periphery of the cushion 2 and secured to flanges 30 and 31 provided respectively on the bear plates 10 and 15. The shield 29 is secured to the flanges by suitable fastening elements 32 and is preferably composed of tough and resilient materials, such as a combination of rubber and fabric, whereby it may flex and stretch in company with the cushion 2 when said cushion is compressed or expanded. The shield may be made to have a limited vertical expansion whereby it may serve as a snubber.

The air chambers 25, 26 and 27 are suitably connected to a source of compressed air, the connections thereto being more or less diagrammatically illustrated in the drawings and as being a flexible hose or conduit 33, extending to the compressed air tank 34 carried on the vehicle, or in the case of a trailer, by the truck. Tubing designated at 35 may also extend from the tank 34 to the front cushion 1 to maintain the required air pressure therein. Conventional tire valves may be employed in the air lines wherever required.

In its simple form, as illustrated in Figs. 1, 2 and 3, the pneumatic suspension means contemplates the provision of an air cushion which is horizontally rather large but of relatively shallow depth vertically. It is located centrally between the wheels of a vehicle and is of such an area as to occupy the greater portion of the distance between the wheels so that it acts to support the vehicle body for all or nearly all of its width on the wide expanse of its upper and lower surfaces. As heretofore set forth, the cushion rests and is supported upon the lower bearer plate 15 carried by the axle while the body of the vehicle is supported from the upper bearer plate 10 which rests on top of the cushion. The cushion is thus interposed between the body of the vehicle and the axle.

The relatively large supporting surface of the cushion provides a maximum of pneumatic support for the vehicle body and its load, and as a result, very smooth riding is assured. By the provision of a supporting cushion of this character, and particularly one divided into a plurality of air chambers in the manner described, a differential in air pressure may be had, to compensate for inequality in loading. That is to say, the side chambers 25 and 26 or either of them might be inflated to greater pressure than the central air chamber 27, or vice versa, according to the imposed load. The flexible partitions 23 and 24, being capable of flexure, will tend to flex when the side chambers are compressed during jolts.

The use of the single large cushion 2 interposed between the wheels and of such an area that it occupies most of the distance between the pair of wheels, as distinguished from the small cushions suggested for use adjacent to each wheel, not only affords smoother riding qualities, but reduces the number of parts required for the mounting of the cushion, thus resulting in manufacturing economies and in a considerable reduction in weight.

In Fig. 5 of the drawings, the support 17 is shown as being provided at its forward and rear ends with flexible link members 67, which may be made of canvas, or of rubber and fabric or other flexible materials. These link members act as radius rods and snubbers and restrain the cushion against excessive expansion when jacking the vehicle against the chassis.

In Fig. 4 of the drawings is shown means by which the required air pressure for a given load will be automatically maintained in the cushion. In the structure there illustrated, the upper bearer plate 10 is of a slightly different shape from that shown in Fig. 2, said plate being provided with a central housing 35 arising from it, the housing 35 having a threaded cap 36 with an outlet connected to piping 37 corresponding to the hose 33 and extending to the air tank 34 or other source of compressed air supply carried by the vehicle. A valve 38 is located in the piping 37 between the air tank and the housing 35, such a valve being preferably located on the instrument board of the vehicle or at any other location adjacent to the driver's seat so that the driver can, by manipulation of the valve, cause the air to flow from the tank 34 into the housing 35 to enter therefrom into the central chamber 27 of the cushion 2 as will be presently described. Within the housing 35, the bearer plate 10 is formed with one or more apertures 39 adapted to be normally closed by an inverted cup valve 40. Valve stem 41 extends through the center of the valve 40, the valve being maintained against the nut 43 and the washer on the end of the stem 41 by means of a coil spring 45 interposed between the under side of the cup valve 40 and the top of the bearer plate 10. The valve stem 41 is surrounded by a sleeve 42 which is threaded at its upper end into the cup valve 40, and said sleeve 42 is slidable through a guide bushing 44 secured to the upper bearing plate 10. The arrangement described is such that normally, i. e., when the central chamber 27 contains the required air pressure for a given load, the cup valve 40 will be in the position shown in Fig. 4, covering the apertures 39 and preventing the entry of additional air into the central chamber 27.

Secured to the lower end of the valve stem 41 is one end of a chain or similar flexible link 46, said link having its opposite end attached to the upper end of the stem 47 of a plug valve 48. This plug valve is normally impelled by the coil spring 56 against a seat provided in the valve chamber 49. This spring 56 is stronger than the spring 45 so that the spring 45 cannot, of itself, unseat the valve 48. In the structure shown in Fig. 4, the bearer plate 15 constitutes the top or upper wall of a tank 50 with which the valve chamber 49 is in communication by means of the aperture 51 when the plug valve 48 is opened as will be explained. From the valve chamber 49 leads a tubing or piping 52 constituting an exhaust outlet for excess air, when the air pressure in the central chamber 27 exceeds a predetermined pressure for a certain load. Tubing 52 includes a valve 53 connected by suitable operating elements, diagrammatically indicated at 54, to the emergency brake of the vehicle. The arrangement is such that when the emergency brake is applied to halt the vehicle, preparatory to loading or unloading the vehicle and thus increasing or decreasing the load carried by it, the valve 53 will be opened for a purpose to be presently set forth.

In normal operation, or when the air pressure in the central chamber 27 is correct for the load then on the vehicle, the parts will be in the positions shown in Fig. 4. That is to say, the apertures 39 will be closed by the cup valve 40; manually-operated valve 38 will be closed and the plug valve 48 will also be closed. During severe jars or jolts, air in the cushion will be compressed and it may partly leave the cushion to enter the tank 50 through the slow leak relief valves 55, which open under excess pressure to pass air from the chamber 27 of the cushion 2 into the tank 50 and then allow it through small seep holes in the valves 55 to slowly re-enter the central compartment 27 of the cushion, whereby a too vigorous re-bound of the vehicle body will be prevented. In other words, under normal conditions, the air pressure in the compartment 27 and that in the tank 50 is equal. When air pressure in compartment 27 is increased, because of a shock or deformation of the cushion, air will then flow into the tank 50 to equalize the pressure in both the compartment 27 and the tank 50. When the shock is passed and deformation of the cushion is over, and equalization of pressure takes place in the tank and cushion, by return flow of air from tank 50 to cushion 27.

Assuming now that a trip has been completed or at least the driver stops to make a delivery, he applies the emergency brake and, in so doing, opens the valve 53 (Fig. 4) through the connections 54. If he then proceeds to unload a portion of the weight carried by the truck, this results in a decrease of the weight imposed on the pneumatic suspension means. Easy riding may then require a reduction in the air pressure in the pneumatic cushions. As the load on the vehicle is decreased, the air pressure in chamber 27 will elevate the upper bearer plate 10, carrying with it the cup valve 40 and its stem 41. As the stem 41 rises, it exerts a pull on the chain 46 to thereby lift the plug valve 48 from its seat, thereby causing air to be exhausted through the outlet piping 52, until the air pressure in the chamber 27 has decreased to an extent sufficient to permit the plate 10 to descend sufficiently to permit the plug valve 48 to be closed by the spring 56. By proper adjustment of the nut 43 the length of the link 46 may be so regulated that an optimum relation may be obtained between the load and the pressure in the cushion 2.

When the loading on the truck is appreciably increased, a reversal of the action just described will take place. That is to say, when the load placed on the truck reaches a point where the air pressure in the cushion is below that required for the proper support of the load, plate 10 will be depressed by said load while the spring 45 will expand to hold the cup valve 40 elevated and the chain 46 taut. The plate 10 will thus recede from contact with the lower edge of the cup valve 40 and cause the apertures 39 to be unsealed. If the valve 48 is at this time open, and it should be opened either manually or automatically each time that the vehicle halts at a loading or unloading point, the compressed air will flow through the apertures 39 into the chamber 27 until sufficient pressure is produced therein to raise the bearer plate 10 enough to cause cup valve 40 to again seat against the plate 10 and thus shut off the feed of further pressure to such chamber. By this time the chamber 27 will contain the pressure required for the load then carried by the vehicle.

In other words, each time that the vehicle is halted for loading or unloading, the operaton of setting the emergency brake will open the exhaust valve 53 and at the same time the valve 38 will be opened either automatically, by attachment to the brake mechanism or manually by the driver. As the truck is unloaded, air will be exhausted from chamber 27 through the plug valve 48, thereby maintaining the required pressure in chamber 27 for the load then borne. If a loading operation is taking place and the load is being increased, the cup valve 40 will open to allow an increase of air pressure in the chamber 27, whereby the proper air pressure for each load will always be present in the cushion.

While I have herein described the automatic means for increasing or decreasing the air pressure according to the load applied to the truck, as used in connection with the central chamber 27 of the pneumatic cushion, it will be obvious that it may be applied to any or all of the chambers provided in the cushion.

In practice, the cushions 1 and 2 may be made round, C-shape, or somewhat elongated or elliptical in form, i. e., substantially circular, or of any other appropriate shape which will function in the manner herein set forth.

In the accompanying drawings I have shown the cushions as being horizontally interposed between the axles and the chassis frame, on which latter the body of the vehicle is conventionally mounted. It has, however, been suggested in vehicle construction, that the chassis frame shall form part and parcel of the body in order to eliminate a separate chassis frame and thus economize in weight and cost of the car. It will be understood that when I have referred to the chassis frame, I contemplate the securing of the upper bearer plates either to such a frame if it is to be used or to the body of the vehicle if the vehicle is of the type which has no chassis frame. The vehicle is provided with the usual brakes.

The foregoing detailed description sets forth the invention in its preferred practical form, but the invention is to be understood as fully commensurate with the appended claims.

What I claim is:

1. A vehicle comprising a chassis frame, a wheeled axle beneath said frame and a broad, relatively shallow weight-carrying pneumatic cushion horizontally interposed between the axle and the chassis frame and supporting the latter above the former, a source of compressed air on the vehicle, a conduit leading from the source of compressed air to the cushion, a normally closed inlet valve in said conduit, an exhaust outlet leading from the cushion having a normally closed exhaust valve coacting therewith, operative connections between the inlet valve and the exhaust valve to admit compressed air into the cushion when the load is such as to vertically compress the cushion beyond a predetermined maximum and to release air from the cushion when the load is such as to allow vertical expansion of the cushion beyond a predetermined maximum, and an additional valve in the exhaust outlet operatively connected with the brake of the vehicle to be opened only when the brake is applied.

2. A vehicle comprising a chassis frame, a wheeled axle beneath said frame and a broad, relatively shallow weight-carrying pneumatic cushion horizontally interposed between the axle and the frame and supporting the latter above the former, a source of compressed air on the vehicle, a conduit leading from the source of compressed air to the cushion, a normally closed inlet valve in said conduit, an exhaust outlet leading from the cushion having a normally closed exhaust valve coacting therewith, operative connections between the inlet valve and the exhaust valve to admit compressed air into the cushion when the load is such as to vertically compress the cushion beyond a predetermined maximum and to release air from the cushion when the load is such as to allow vertical expansion of the cushion beyond a predetermined maximum, an additional valve in the exhaust outlet operatively connected with the brake of the vehicle to be opened only when the brake is applied, and an additional valve in the inlet conduit adapted to be closed when the vehicle is at rest.

3. In a pneumatic suspension, a cushion member of disk form provided with a central opening, a plate secured over and closing the top of the opening, a second plate secured over and closing the bottom of the opening, one of the plates constituting a wall of an air pressure tank, the tank being attached to the undercarriage of a vehicle, the other plate being attached to the chassis of the vehicle, and slow return valve means between the interior of the cushion and the tank permitting a relatively quick flow of air from the cushion into the tank when the cushion is deformed, and permitting a slow return of the air from the tank to the cushion after deformation of the cushion has occurred.

4. In a pneumatic suspension system, a pair of plates, one of said plates being secured to a vehicle chassis, the second plate being secured to the axle of the vehicle, a circular air cushion interposed between and secured to the plates, the cushion having a central opening closed by the plates, the second one of the plates forming a wall of an air tank, and valves operative through said wall to permit a relatively quick flow of air from the cushion into the tank when shock is imposed on the cushion and a relatively slow return of air to the cushion from the tank after the shock has passed.

5. A vehicle comprising, a chassis frame, an upper horizontal, substantially disk-shaped bearer plate secured to the chassis frame and extending transversely thereof in a substantially horizontal plane for the greater portion of the width of the vehicle, a wheeled axle positioned beneath the chassis frame, a lower bearer plate secured to said axle and extending transversely thereof in a substantially horizontal plane for the greater portion of the width of the vehicle, said upper and lower bearer plates being in facial vertically opposed relation, a disk-like weight-carrying pneumatic cushion positioned between said bearer plates for supporting and spacing the upper bearer plate from the lower bearer plate, the cushion being provided with a plurality of internal, spaced vertical walls defining a central air chamber between them in the cushion, the top and bottom of said air chamber being formed by the bearer plates.

6. A vehicle comprising, a chassis frame, an upper horizontal, substantially circular bearer plate secured to the chassis frame and extending transversely thereof in a substantially horizontal plane for the greater portion of the width of the vehicle, a wheeled axle positioned beneath the chassis frame, a disk-shaped lower bearer plate secured to said axle and extending transversely thereof in a substantially horizontal plane for the greater portion of the width of the vehicle, said upper and lower bearer plates being in facial vertically opposed relation, a disk-shaped weight-carrying pneumatic cushion positioned between said bearer plates and being at least as large in diameter as said bearer plates and supporting and spacing the upper bearer plate from the lower bearer plate, said bearer plates constituting respectively the central portions of the top and bottom of the air cushion, and flexible members connecting the peripheries of the upper and lower bearer plates and secured to both of them and extending across the periphery of the air cushion.

7. A vehicle comprising, a chassis frame, an upper horizontal bearer plate secured to the chassis frame and extending horizontally thereof and transversely for the greater portion of the width of the vehicle, a wheeled axle secured beneath the chassis frame, a lower bearer plate secured to said axle and extending transversely thereof in a substantially horizontal plane for the greater portion of the width of the vehicle, said upper and lower bearer plates being in facial vertically opposed relation, a disk-shaped weight-carrying pneumatic cushion positioned between said bearer plates for supporting and spacing the upper bearer plate from the lower bearer plate, the upper and lower bearer plates respectively constituting the top and bottom walls of a central air chamber in the cushion, a flexible shield member connecting the outer peripheries of the upper and lower bearer plates, said shield extending across the periphery of the pneumatic cushion.

RENE GOUIRAND.

REFERENCES CITED

The following references are of record in the file of this patent:

UNITED STATES PATENTS

| Number | Name | Date |
|---|---|---|
| 699,709 | Pulbrook | May 13, 1902 |
| 1,043,677 | Davis | Nov. 5, 1912 |
| 1,130,656 | Annable | Mar. 2, 1915 |
| 1,152,609 | Davis | Sept. 7, 1915 |
| 1,414,623 | Church | May 2, 1922 |
| 1,457,157 | Galbraith | May 29, 1923 |
| 1,488,646 | Nygaard | Apr. 1, 1924 |
| 2,023,135 | Hawkins | Dec. 3, 1935 |
| 2,065,665 | Dietrich | Dec. 29, 1936 |
| 2,361,575 | Thompson | Oct. 31, 1944 |

FOREIGN PATENTS

| Number | Country | Date |
|---|---|---|
| 22,140 | Great Britain | Oct. 14, 1905 |
| 89,851 | Germany | Feb. 28, 1896 |
| 574,467 | France | Mar. 31, 1924 |